(12) United States Patent
Prendergast

(10) Patent No.: US 6,957,449 B2
(45) Date of Patent: Oct. 25, 2005

(54) ROTATABLE HELMET MOUNT

(75) Inventor: Jonathon R. Prendergast, Newport Beach, CA (US)

(73) Assignee: Norotos, Inc., Santa Ana, CA (US)

(*) Notice: Subject to any disclaimer, the term of this patent is extended or adjusted under 35 U.S.C. 154(b) by 0 days.

(21) Appl. No.: 10/818,828

(22) Filed: Apr. 5, 2004

(65) Prior Publication Data

US 2004/0244099 A1 Dec. 9, 2004

Related U.S. Application Data

(60) Provisional application No. 60/460,538, filed on Apr. 4, 2003.

(51) Int. Cl.$^7$ ................................................. A42B 1/24
(52) U.S. Cl. ................................ 2/422; 2/6.2; 359/409
(58) Field of Search .............................. 2/422, 6.6, 6.2, 2/6.3, 6.7; 359/409, 815, 632; 224/181

(56) References Cited

U.S. PATENT DOCUMENTS

| | | |
|---|---|---|
| 1,226,101 A | 5/1917 | Marsden |
| 2,284,180 A | 5/1942 | Thomas |
| 2,517,892 A * | 8/1950 | Larrabee et al. ............ 359/409 |
| 4,156,292 A * | 5/1979 | Helm et al. .................... 2/422 |
| 4,449,787 A | 5/1984 | Burbo et al. |
| 4,553,873 A | 11/1985 | Salice |
| 4,577,347 A * | 3/1986 | Connon ........................... 2/6.2 |
| 4,660,943 A * | 4/1987 | Ellis ............................ 359/362 |
| 4,689,834 A | 9/1987 | McCarthy et al. |
| 4,697,783 A | 10/1987 | Kastendieck et al. |
| 4,987,608 A | 1/1991 | Cobb |
| 5,176,342 A | 1/1993 | Schmidt et al. |
| 5,179,735 A | 1/1993 | Thomanek |
| 5,226,181 A | 7/1993 | Polednak et al. |
| 5,331,684 A | 7/1994 | Baril et al. |
| 5,339,464 A | 8/1994 | Dor |
| 5,347,119 A | 9/1994 | Connors |
| 5,408,086 A | 4/1995 | Morris et al. |
| 5,465,124 A * | 11/1995 | Nussenbaum ............... 351/245 |
| 5,467,479 A | 11/1995 | Mattes |
| 5,469,578 A | 11/1995 | Mattes |
| 5,471,678 A | 12/1995 | Dor |
| 5,506,730 A | 4/1996 | Morley et al. |
| 5,542,627 A | 8/1996 | Crenshaw et al. |
| 5,581,806 A | 12/1996 | Capdepuy et al. |
| 5,648,862 A | 7/1997 | Owen |
| 5,703,354 A | 12/1997 | Wannagot et al. |
| 5,914,816 A | 6/1999 | Soto et al. |
| D449,411 S | 10/2001 | Largeot |
| 6,457,179 B1 | 10/2002 | Prendergast |
| 6,462,867 B2 * | 10/2002 | Choinere ..................... 359/409 |
| 6,472,776 B1 | 10/2002 | Soto et al. |
| 6,751,810 B1 | 6/2004 | Prendergast |

OTHER PUBLICATIONS

U.S. Appl. No. 10/820,977, by inventor Prendergast, filed Apr. 7, 2004.

\* cited by examiner

Primary Examiner—Rodney M. Lindsey
(74) Attorney, Agent, or Firm—Christie, Parker & Hale, LLP

(57) ABSTRACT

A helmet mount for a night vision device is provided having means to attached to headgear, such as a helmet, wherein the mount is rotatable between a use position and a stowed position about an axis that is substantially parallel to the attachment means. In one embodiment, a position adjustment assembly comprises a rotary plate, a helmet block rotationally coupled to the rotary plate and a spring-biased ball and socket system located between the helmet bock and rotary plate. In another embodiment, a tilt adjustment assembly may include a gear system wherein rotation of a lever produces rotation of a night vision device relative to a user's eyes.

15 Claims, 15 Drawing Sheets

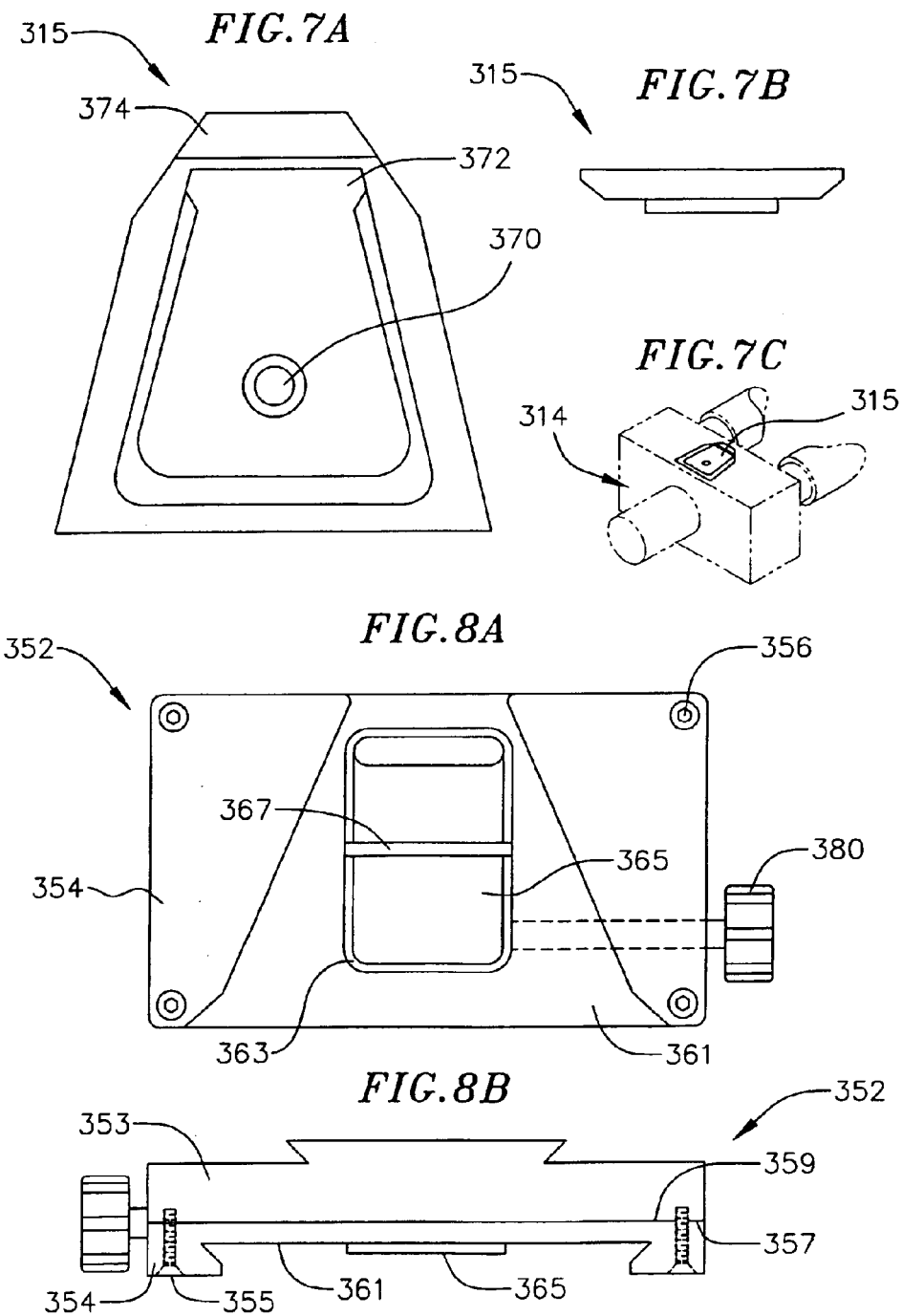

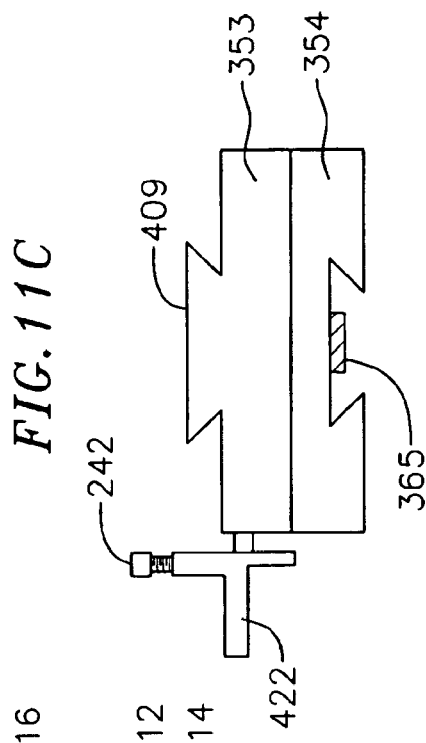
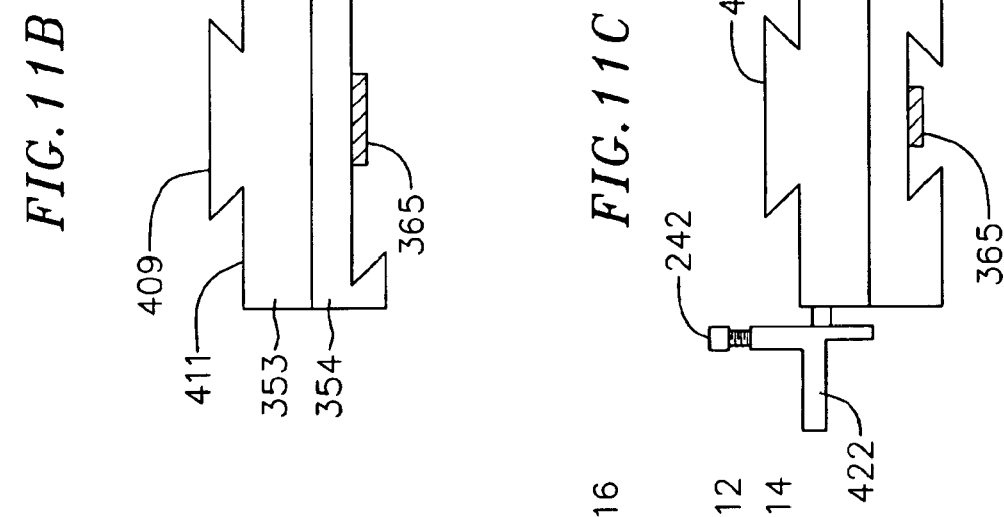
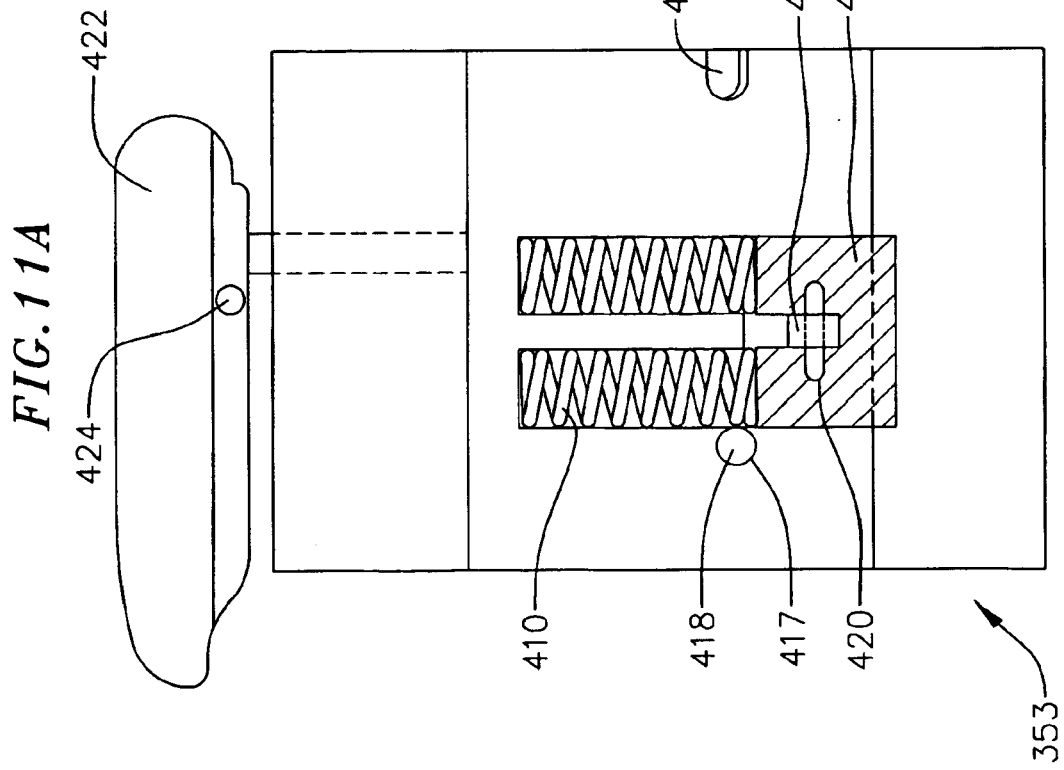

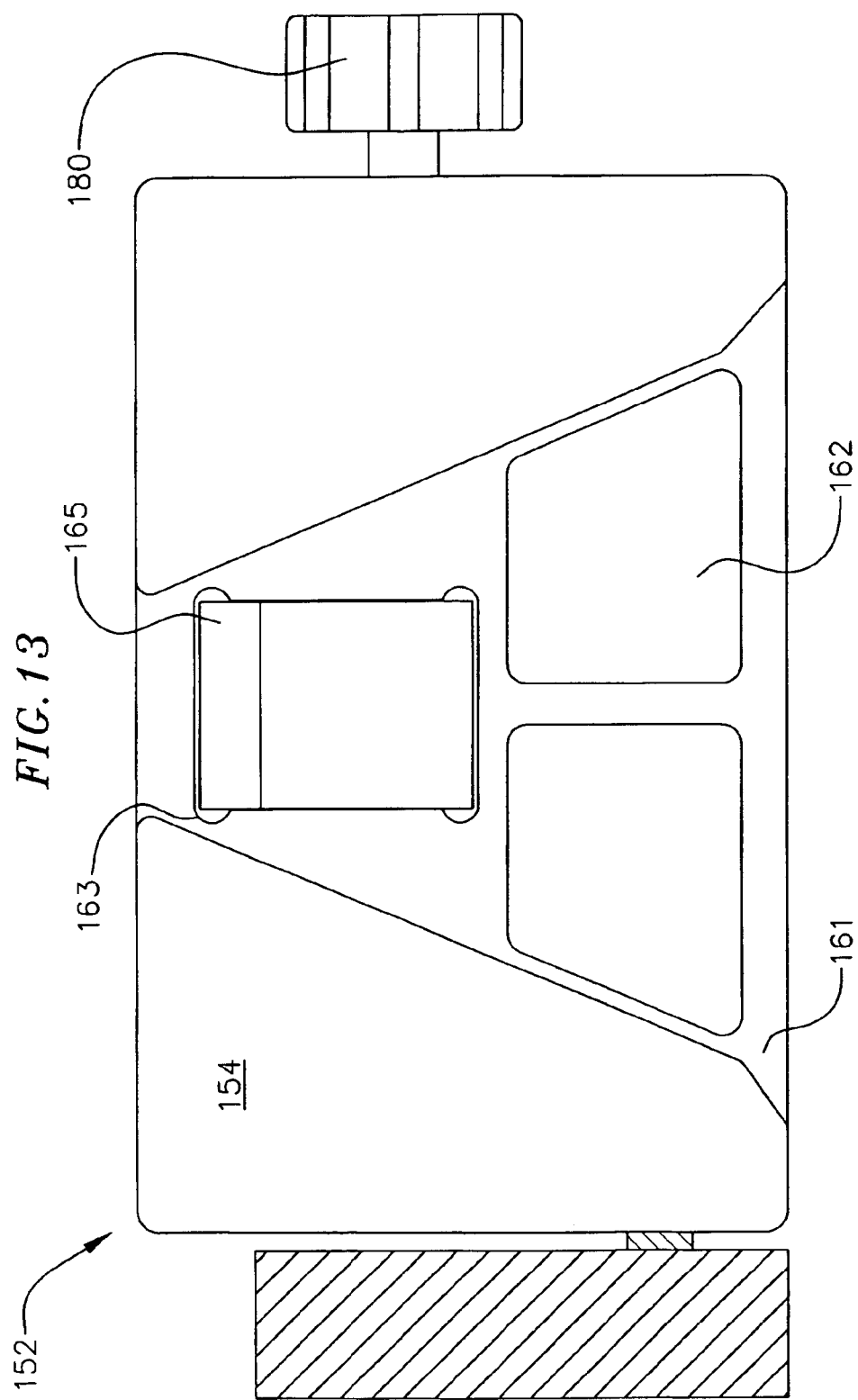

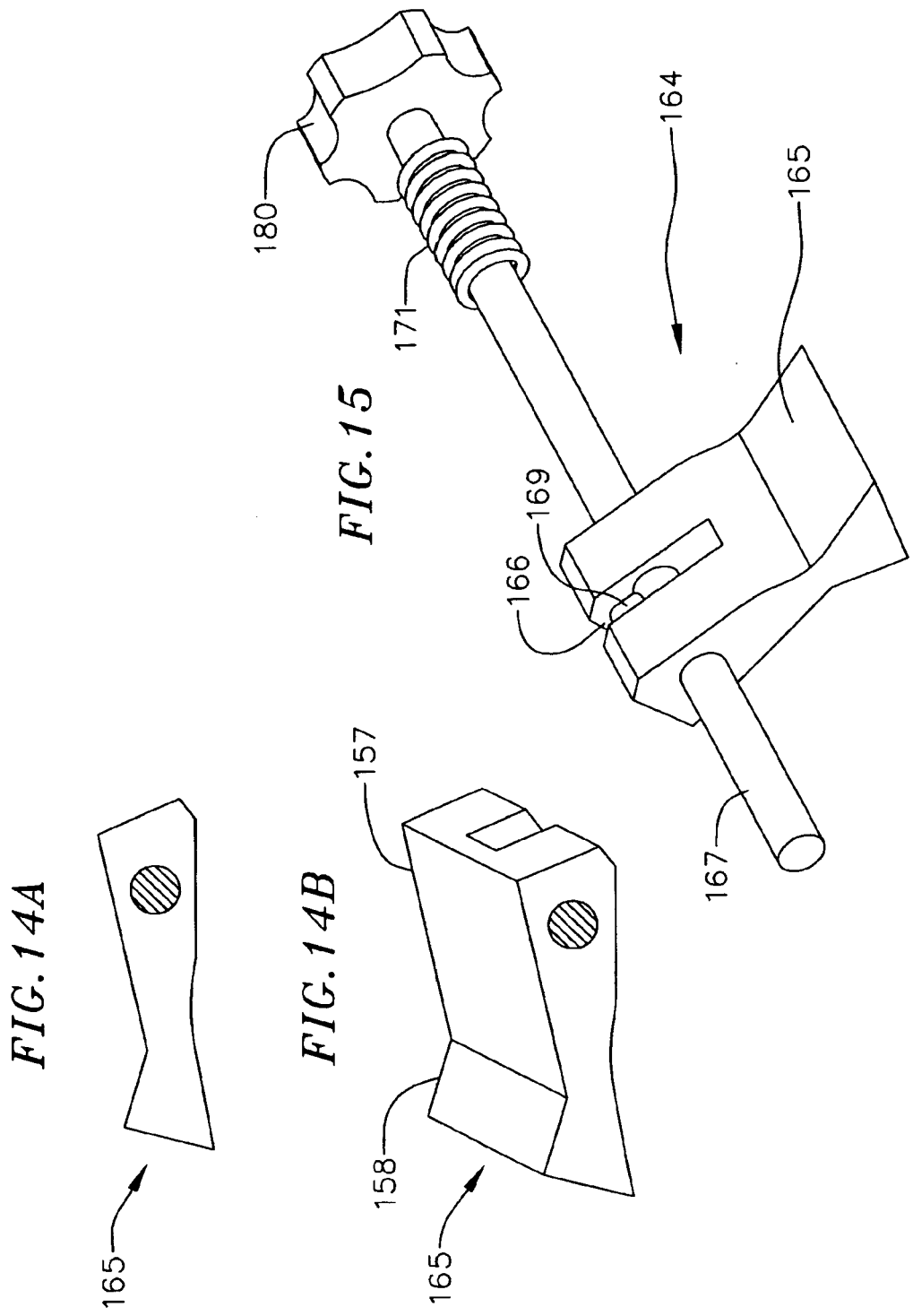

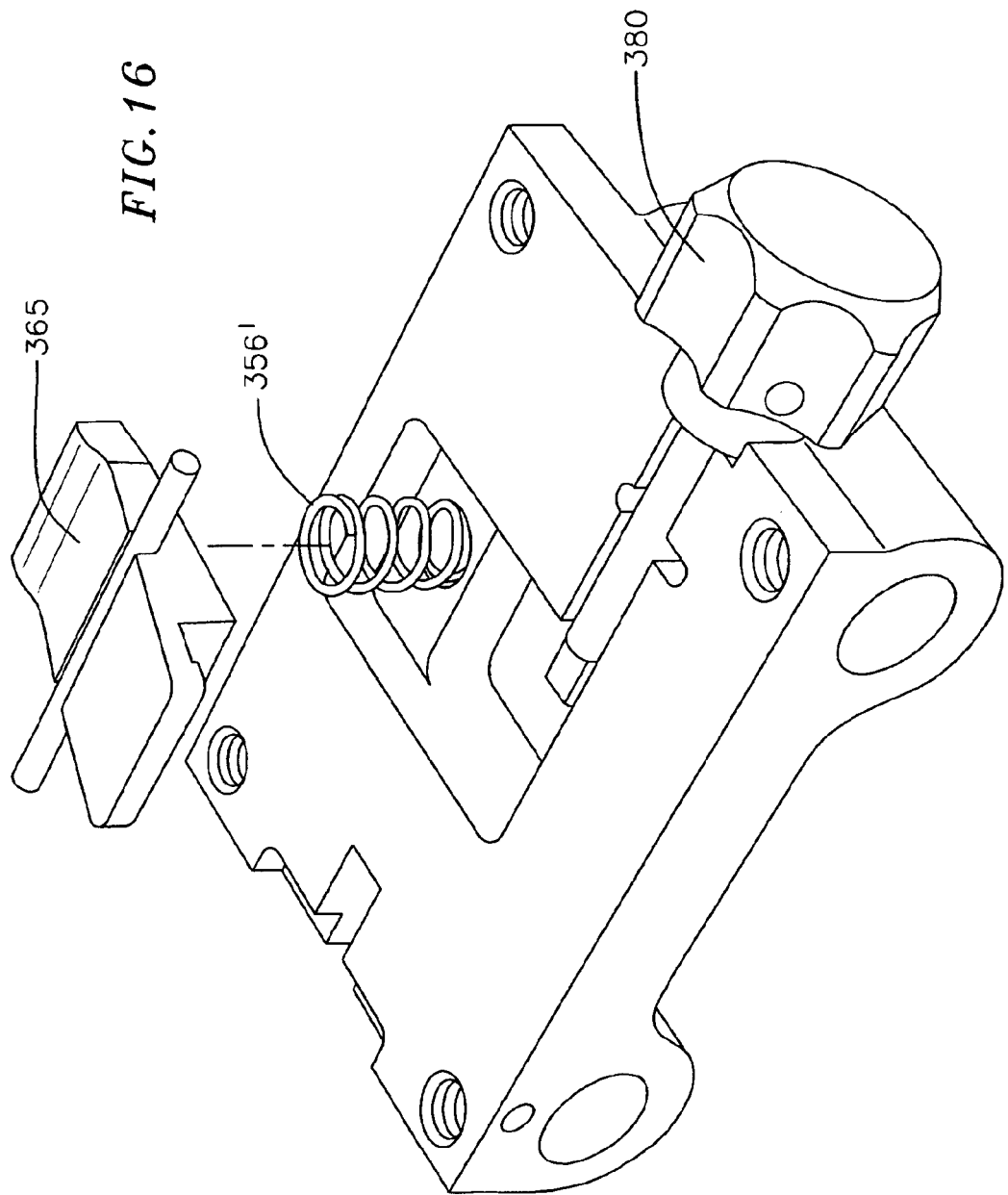

ROTATABLE HELMET MOUNT

CROSS-REFERENCE TO RELATED APPLICATION(S)

This application claims the benefit of the filing date of U.S. Provisional Patent Application Ser. No. 60/460,538, filed Apr. 4, 2003 and entitled ROTATABLE HELMET MOUNT, the entire content of which is hereby expressly incorporated by reference.

FIELD OF THE INVENTION

This invention relates generally to mounting assemblies for night vision devices, and more particularly to a rotatable helmet mount for night vision devices that rotates a night vision device between a use position and a stowed position and preferably includes vertical adjustment, tilt adjustment, and focal adjustment. The invention may also include automatic shutdown assemblies.

BACKGROUND OF THE INVENTION

Night vision devices are commonly used by military personnel for conducting operations in low light or night conditions. The night vision devices utilized by the military typically include image intensifier tubes and associated optics that convert infrared and near infrared light into viewable images. A common night vision device currently being used in the U.S. Army is the PVS7 night vision device, manufactured by ITT Corporation in Roanoke, Va.

Assemblies for mounting night vision devices to a helmet are well known in the art. These mounting assemblies allow a user's hands to remain free while viewing a scene through the night vision device. Prior art mounting assemblies typically include one or more of the following features: positional adjustment of the night vision device between a use and stowed position; tilt angle adjustment of the night vision device relative to the user's eyes; focal adjustment of the location of the night vision device relative to the user's eyes; and automatic shutdown of the night vision device when not in the use position.

A known mounting assembly for night vision devices encompasses a flip-up helmet mount that attempts to provide all of the features identified above. See, for example, U.S. Pat. Nos. 5,914,816 to Soto et at., 6,457,179 to Prendergast and 6,472,776 to Soto et al. which are incorporated herein by reference. However, when the previously disclosed mounting assemblies are flipped up, the night vision device rests a few inches away from the front edge of the helmet. This places the center of gravity of the night vision device/helmet mount assembly further forward than simply the helmet alone and may place an undue strain on the user's neck. It is desirable to have a night vision mounting assembly that accomplishes the features identified above, yet places less strain on the user's neck.

Known flip-up helmet mounts also require the presence of an automatic shutdown assembly. This feature is desired because a phosphor yellow/green light emitted from the night vision device would be visible to possibly hostile personnel in front of the operator if the device was not turned off when stowed. However, should the automatic shutdown assembly fail to operate for any reason, the user may be placed in a potentially dangerous situation.

These and other problems could exist with the flip-up helmet mounts for night vision devices disclosed in the prior art. Consequently, a need exists for a different approach to a helmet mount.

SUMMARY

The present invention provides a different approach to a helmet mount for night vision devices. More particularly, the helmet mount according to the present invention is designed to rotate so that, in the stowed position, the center of gravity of the night vision device/helmet assembly is more directly over the center of the user's head, reducing strain on the user's neck. In addition, the rotatable helmet mount is designed so that the eyepieces which may emit a phosphor yellow/green light are flush with the helmet and the light is not particularly visible when the device is in a stowed position.

BRIEF DESCRIPTION OF THE DRAWINGS

FIGS. 7a–7b are a top and side view, respectively, of a goggle horn.

FIG. 7c is a schematic representation of the goggle horn of FIGS. 7a–7b attached to a night vision device.

FIGS. 8a–8b are a bottom and rear view, respectively, of one embodiment of a socket assembly.

FIGS. 11a–11c are a top, front and rear view, respectively, of a focal adjustment assembly.

FIG. 13 is a top view of one embodiment of a socket assembly.

FIGS. 14a–14b are a side view and perspective view, respectively, of a detent.

FIG. 15 is a perspective view of a goggle release assembly.

FIG. 16 is a perspective view of an alternate embodiment of a socket assembly.

DETAILED DESCRIPTION

Figure 1:
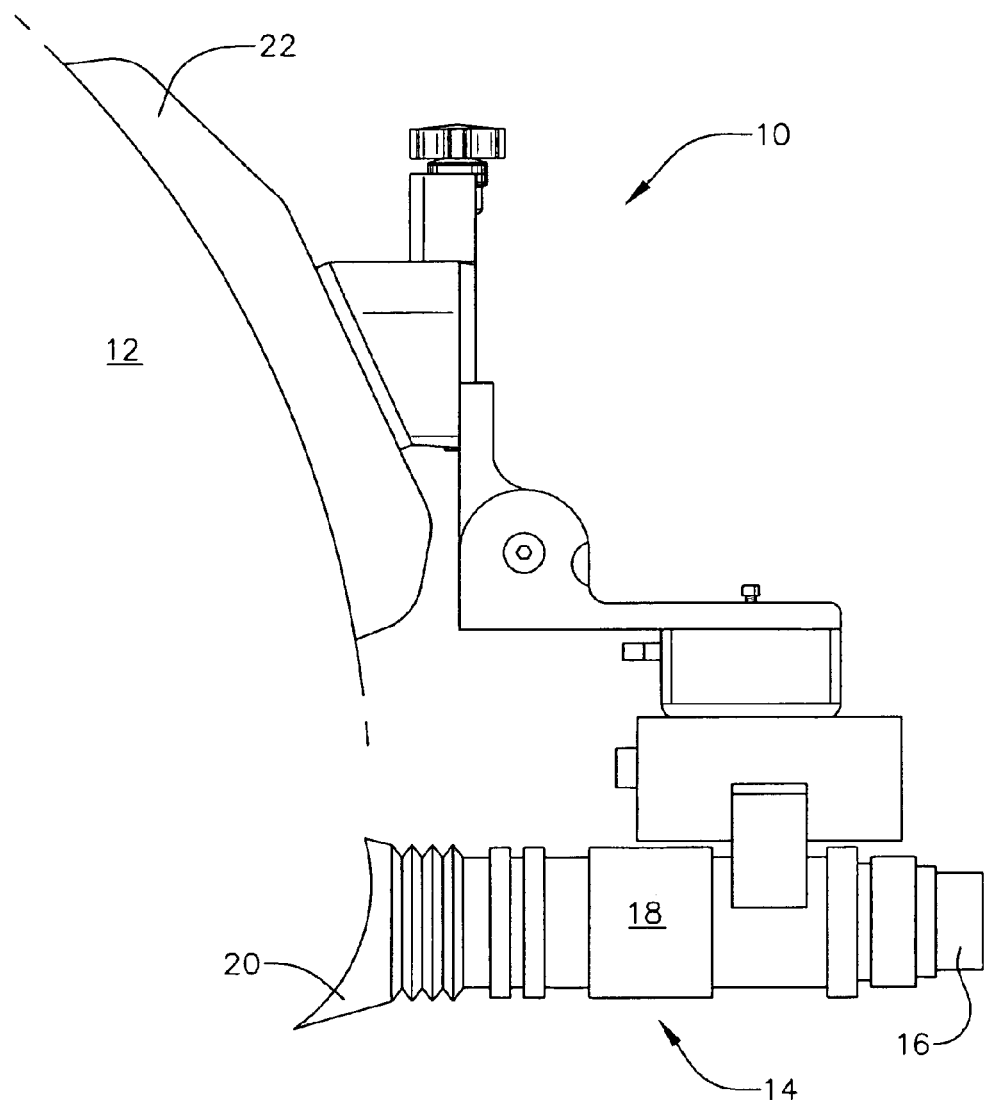
FIG. 1 is a perspective view of a flip-up helmet mount according to one embodiment of the present invention secured to a helmet, wherein the night vision device is in a use position.

Referring now to FIG. 1, a presently preferred embodiment of a rotatable helmet mount 10 according to the present invention is shown. The rotatable helmet mount 10 is shown in use with a standard U.S. Army Kevlar composite helmet 12. A night vision device 14 is secured to the helmet 12 by use of the rotatable helmet mount 10. The night vision device 14 shown in FIG. 1 is a device that includes a single objective lens 16, a housing 18 and a pair of eye pieces 20. To use the night vision device 14, the operator places the device into the position depicted in FIG. 1 and looks into the eye pieces 20 to see an enhanced image representative of the low-level light from a night scene which has entered the objective lens.

The rotatable helmet mount 10 may be secured to the helmet 12 in any of the ways well known in the art. FIG. 1 shows the rotatable helmet mount secured to the helmet by means of a shroud plate 22. The shroud plate 22 is described in U.S. patent application Ser. No. 10/389,648, Filed on Mar. 13, 2003, entitled "Shroud Plate"), which is incorporated herein by reference. The shroud plate 22 comprises a shell, an insert, a lock and a release button. A lock plate may be inserted into the insert where it will be secured in place by the lock and may be released by using the release button. The rotatable helmet mount 10 may also be secured to the helmet 12 by the use of a quick release mechanism which may be attached to the helmet by a strap or with fasteners.

The night vision device may be removably attached to the rotatable helmet mount. In an exemplary embodiment, the night vision device is removably secured to a socket assembly 152, on the helmet mount, comprising a housing 154 (FIG. 13). The housing 154 as shown in FIG. 13 has a receiving area 161 formed by a tapered recess located centrally across the width of the housing 154. The receiving area is configured to receive a portion of a night vision device, such as a goggle horn. Substantially centered within the receiving area 161 is a dugout 163 which may house part of a release assembly 164. In one embodiment, the release assembly 164 may comprise a detent 165, a rod 167, a protrusion 169, a spring 171 and a knob 180. The detent 165 serves to securely connect a night vision device to the socket 152 and thereby to the helmet mount 10. Additionally, the housing 154 may contain additional dugouts 162 which are created to minimize the weight of the socket assembly 152 but do not jeopardize its structural integrity.

In one embodiment, the detent 165 may have a channel 166 running about half of its length and bisecting its width as shown in FIG. 15. The exact shape of the detent 165 is not critical, but the detent should be shaped such that it secures a night vision device to the mount 10. As shown in FIGS. 14a–14b, in one exemplary embodiment the detent 165 may have a bowtie shape when viewed from the side, rectangular when viewed from the top, having a channel end 157 and an operating end 158. A rod 167 may run perpendicularly through the detent 165 and the channel 166. Attached to the rod 167 and extending outwardly at a right angle to the longitudinal axis of the rod may be a protrusion 169 which is adapted to fit within the channel 166. Attached to and encircling an end of the rod 167 may be a spring 171 and a knob 180. In one configuration, when the socket assembly 152 is assembled, the rod 167 is passed through openings in the housing 154 and the detent 165 is aligned within the dugout 163. The walls of the dugout 163 prevent lateral movement of the detent 165 while the protrusion 169 prevents lateral movement of the rod 167. Further, a spring (not shown) in the dugout 163 biases the detent 165 so that its operating end 158 is elevated above the surface of the goggle horn receiving area 161.

As shown in FIGS. 7a–7c, the night vision device may include a goggle horn 315 that is adapted to be received in the socket assembly 152 of the helmet mount. The goggle horn 315 may be attached to the night vision device 314 as shown in FIG. 7c by a screw or bolt which is inserted through a hole 370. The hole 370 may be two-tiered or have a counterbore such that the head of a screw or bolt inserted into the hole is flush with a receiving area 372. In an exemplary embodiment, the goggle horn 315 may be wedge-shaped such that is has a wider front area that tapers to a smaller back area so as to fit into the receiving area 161 on the lower socket 154 of the socket assembly 152 of FIG. 13. The goggle horn 315 further may have tapered sidewalls which correspond to the tapered sidewalls of the goggle horn receiving area 161 and further ensure a secure fit between the night vision device 314 and the mount 10.

In a preferred embodiment, the goggle horn 315 has a receiving area 372 which is indented below the top surface of the goggle horn and which is adapted to receive the detent 165. As the socket assembly 152 is introduced to the goggle horn 315, the socket assembly slides over the tapered front edge 374 of the goggle horn. As the goggle horn 315 slides further along the receiving area 161, the goggle horn 315 overcomes the spring-biased detent 165 until the detent is received by the receiving area. The socket assembly 154 is prevented from further movement by tapered inner walls of the goggle horn 315 that secure the detent 165 to the receiving area 372.

In an exemplary embodiment, in order to release the socket assembly 152 from the goggle horn 315, a user may turn the release knob 180. The release knob 180 may be spring-biased so as to return to its unrotated position after it is rotated. The release knob 180 is rotationally coupled to the rod 167 and thus also to the protrusion 169. When the knob 180 is initially rotated a certain number of degrees, the protrusion passes through the open channel 166 in the detent 165. In other words, even though the knob 180 is rotated, the rotation will not cause the protrusion 169 to act on the detent 165 and thus, the initial rotation will not act to release the night vision device 314 from the helmet mount 10. This "free rotation" is built into the socket assembly 152 as a safety device to prevent the accidental release of the night vision device 314 from the helmet mount 10 if, for instance, the user brushes against tree branches or other obstacles during a maneuver. The amount of free rotation is not critical, but is preferably between about 60°–120°. If the knob 180 is rotated past the critical number of degrees of free rotation, the protrusion 169 will engage the detent 165. When the protrusion 169 engages the detent 165, the detent will rotate as the knob 180 is rotated, forcing the detent to overcome the spring bias and allowing the elevated back surface of the detent 165 to detach from the receiving area 372 of the goggle horn 315.

In an alternate embodiment, as shown in FIGS. 7a–8b, a night vision device 314 is removably secured into a socket assembly 352. The socket assembly 352 as shown in FIGS. 8a–8b has an upper socket 353 and a lower socket 354 coupled to the upper socket 353 by screws 355. The upper socket 353 has a contacting surface 359. The lower surface 354 has a contacting surface 357 that abuts contacting surface 359 when the upper socket 353 and lower socket 354 are coupled.

As described above and further shown in FIG. 8b, the lower socket 354 has a goggle horn receiving area 361 similar to the socket assembly 152 of FIG. 13. In addition, the lower socket 354 has cylindrical holes 356 that extend from the bottom of socket 354 through contacting surface 357. Threaded holes 356 are provided for receipt of screws 355. In a preferred embodiment, there are four holes, with one hole in each corner of the lower socket 354.

In this embodiment, the detent 365 may have a channel centrally located along its width, dividing the detent 365 into two halves and adapted to hold a rod 367. The rod 367 may be fitted into two holes in either side wall of the dugout 363 and serves as a surface on which the detent 365 may pivot. The detent 365 has a front surface which may slope toward the front of the socket assembly 352. The detent 365 further may have a ramped back surface that hooks into an indented receiving area 372 on the goggle horn 315 on the night vision device 314 for secure assembly. The back surface of the detent 365 may be biased above the top of the dugout 363 by a spring 356' located underneath the top half of the detent 365. This allows the detent 365 to protrude into receiving area 372 of the goggle horn 315 (FIG. 7a) and secure it to the socket 354.

As shown in FIG. 16, a release knob 380 is rotationally coupled to a cam (not shown) located above the front half of detent 365. When the cam is rotated, it overcomes spring-biased detent 365 to disengage the elevated back surface of the detent 365 from receiving area 372 of goggle horn 315. In a preferred embodiment, the user must rotate knob 380 120° in order to disengage detent 365. In this embodiment, the first 90° of rotation are redundant, i.e. they have no effect on detent 365, while the last 30° cause the detent to move. This insures that inadvertent movement of the knob 380 will not detach the night vision device from the helmet. Once the detent 365 is disengaged from the goggle horn 315, a user may slide the night vision device 314 out of the socket 354.

Figure 18:
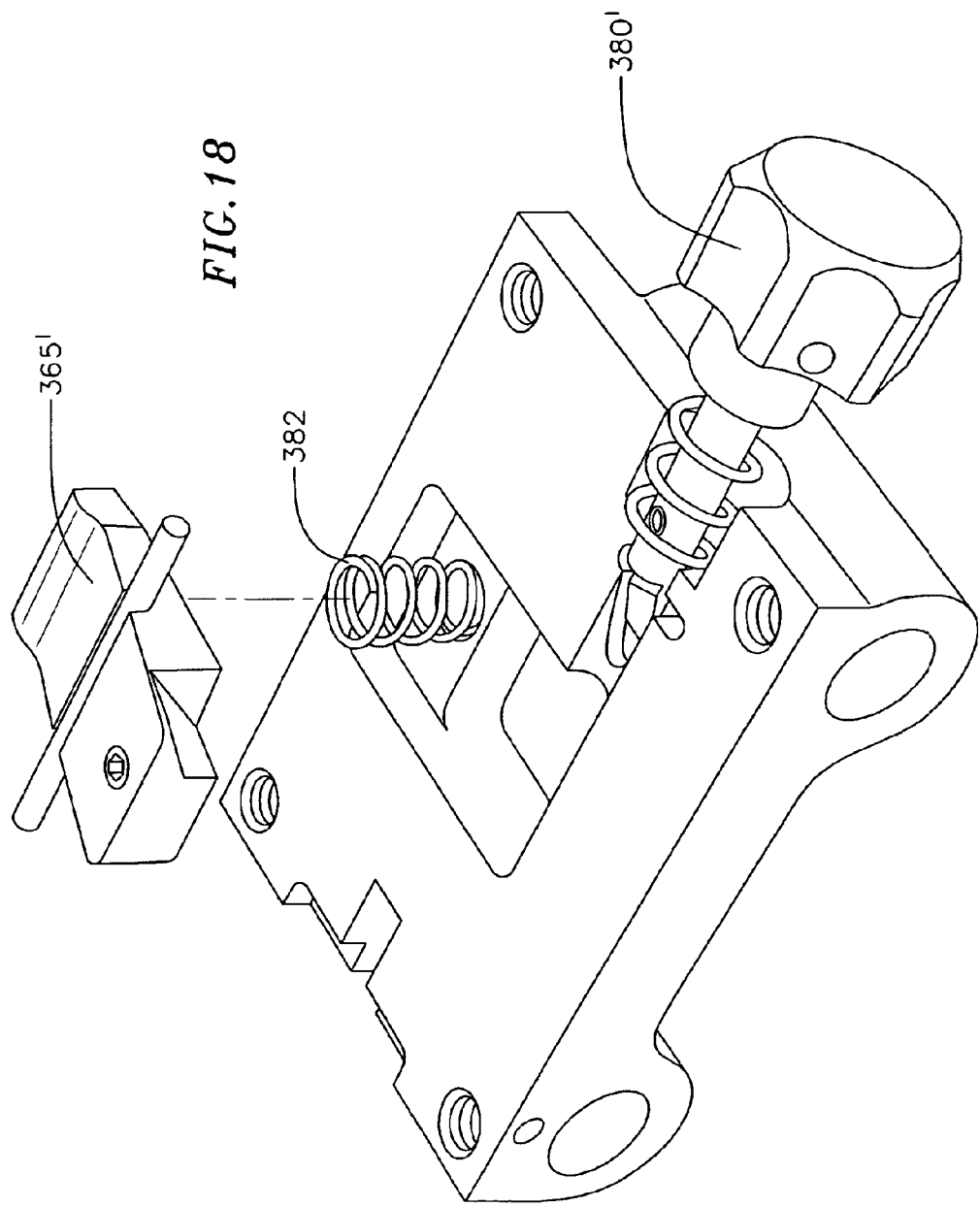
FIG. 18 is a perspective view of an alternate socket assembly.

In yet another alternate embodiment as shown in FIG. 18, a spring-biased knob 380 may be connected to a wedge-shaped cam. In order to disengage the detent 365 from the goggle horn 315, the user may rotate and then push in the knob 380 so as to drive the wedge underneath the detent 365. The wedge will then cause the front portion of the detent 365 to rise and the back portion to lower, allowing removal of the goggle horn 315. The requirement for two distinct motions for disengagement provides for further protection against inadvertent disengagement should such further protection be desired.

POSITION ADJUSTMENT

Figure 17:
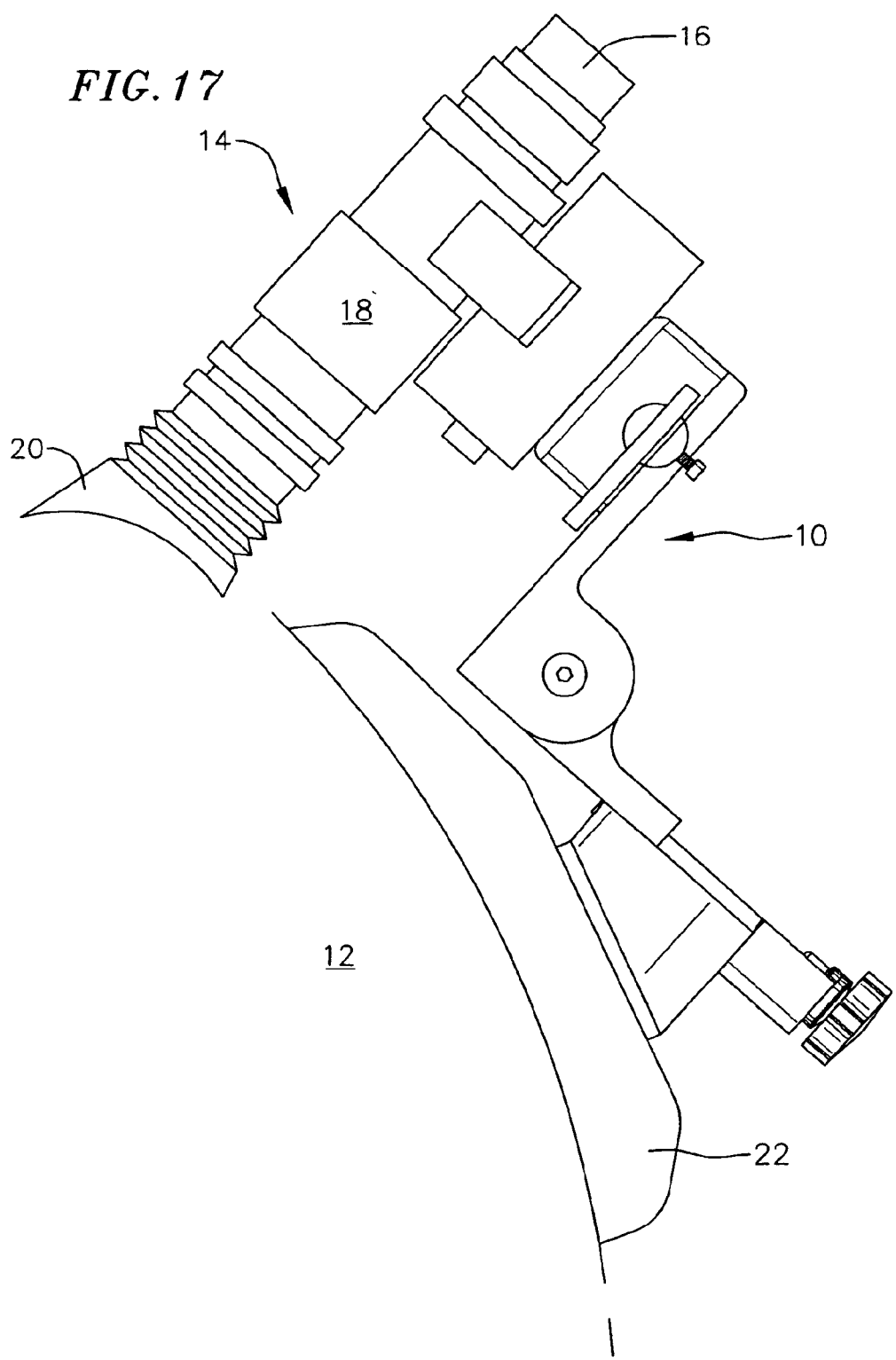
FIG. 17 is a side view of a rotatable helmet mount attached to a helmet with the night vision device attached in the stowed position.

In FIG. 1, the night vision device 14 is positioned in front of the operator's eyes so that the operator may look through the eye pieces 20 of the night vision device 14. In FIG. 17, the night vision device 14 is positioned completely above the line of sight of the operator, to permit normal, unobstructed vision, unaided by the night vision device 14. Viewing FIG. 1 in combination with FIG. 17, the rotatable helmet mount 10 is rotatable about a point in front of the headgear and above the line of sight of the user in a circular motion within a plane which is generally tangential to a point of attachment of the night vision device 14 and the helmet 12 to allow the operator to rotate the night vision device 14 in either a clockwise or counter-clockwise direction between the use position and the stowed position.

Figure 2:
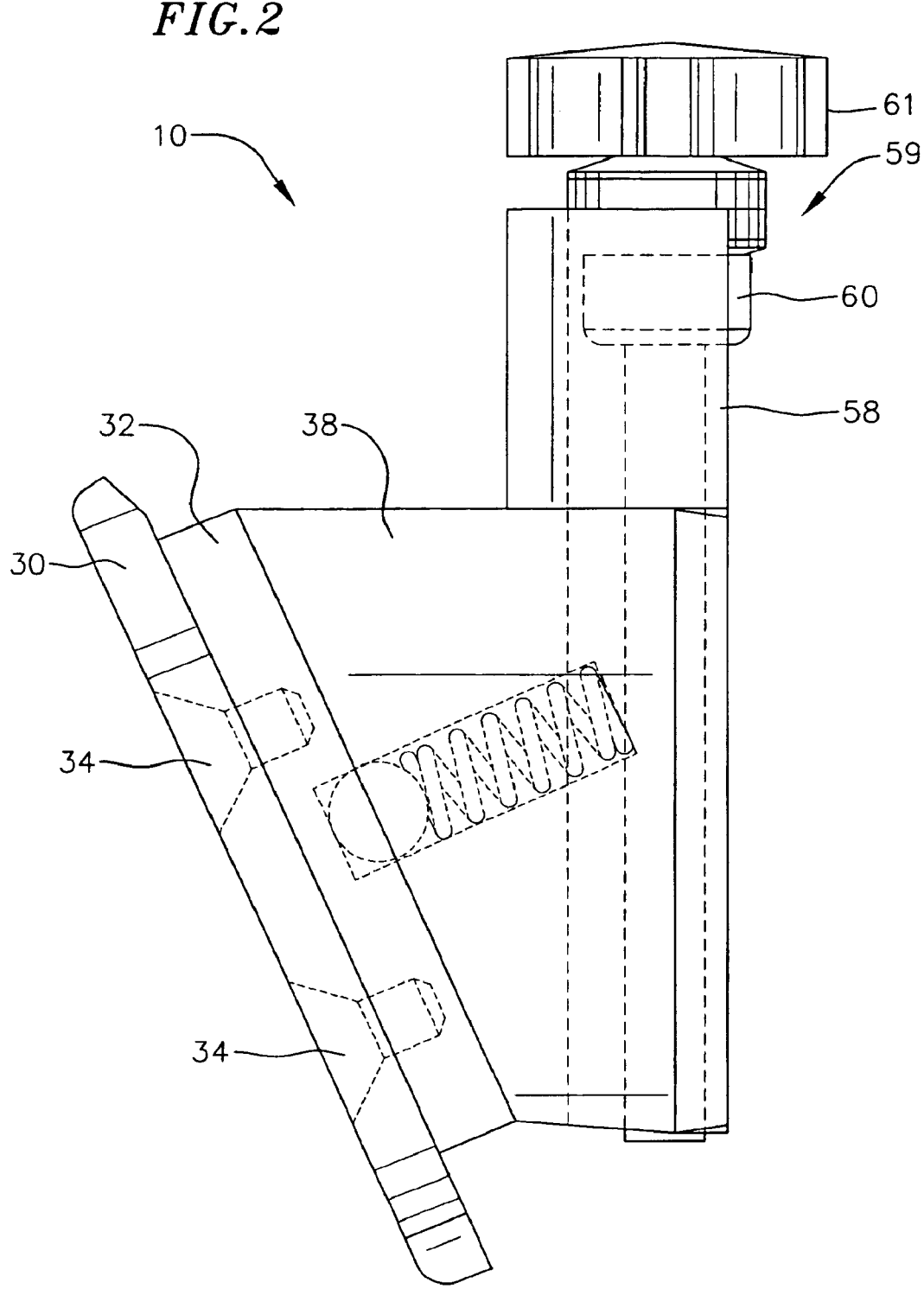
FIG. 2 is a partial side view of an exemplary embodiment of a rotatable helmet mount.
Figure 3:
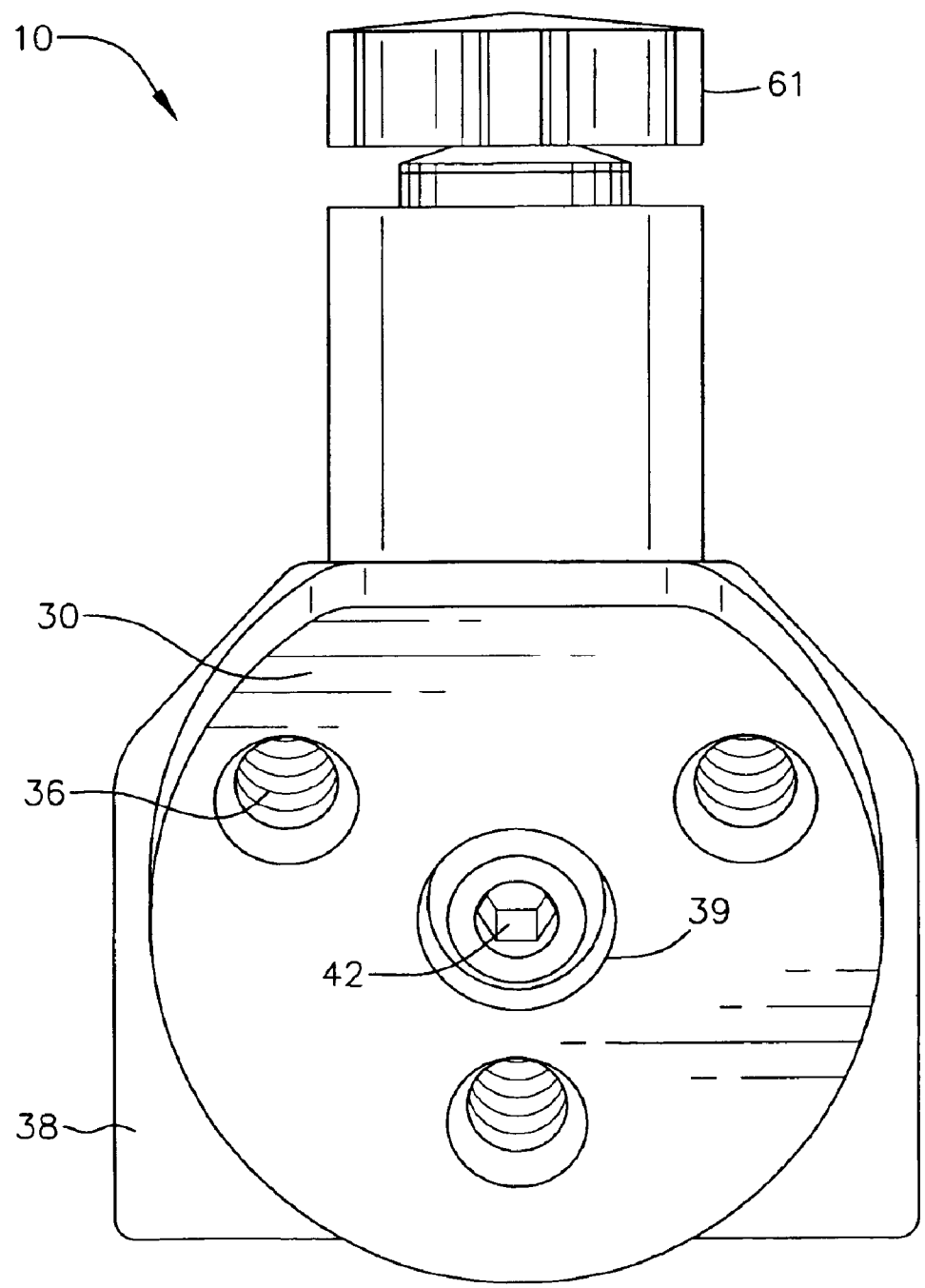
FIG. 3 is a rear view of an exemplary embodiment of a rotatable helmet mount.
Figure 6:
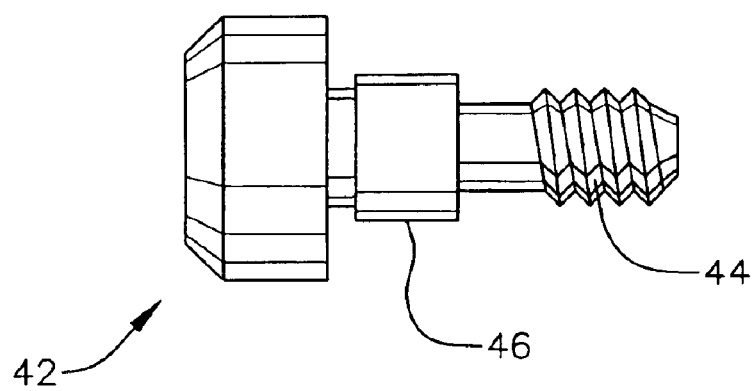
FIG. 6 is a side view of a screw which may attach a rotary plate to a helmet block.

In order to enable the operator to adjust the position of the night vision device 14, the night vision device 14 is rotationally coupled with helmet block 38. As shown in FIGS. 2 and 3, the rotatable helmet mount 10 comprises a rotary plate 30 which may be secured to a lock plate 32 or any other device which enables the rotatable helmet mount to attach to a helmet. In an exemplary embodiment, the rotary plate 30 is attached to the lock plate 32 by the screws 34. The screws 34 may be inserted through holes in the lock plate 32 and threaded into holes 36 in the rotary plate 30. The rotary plate 30 may also be attached to lock plate 32 by any other suitable means, such as by rivets or bolts. In an alternate embodiment, the face of the rotary plate 30 may be separated from a helmet block 38 by an O-ring (not shown). Rotary plate 30 may be attached to helmet block 38 by a screw 42 which is inserted through a hole 39 in the center of the rotary plate 30 and threaded into a hole 41 in the helmet block 38. As shown in FIG. 6, the screw 42 may comprise a main cylindrical body having a threaded tip 44 and having a smooth middle section 46. The smooth middle section 46 serves as an axle on which the rotary plate 30 may rotate. The rotary plate 30 may also be attached to the helmet block 38 by any other suitable means.

In an exemplary embodiment, the helmet block 38 may comprise a rear face slanted at an angle which corresponds to the front of the helmet so as to allow the night vision device to remain substantially parallel to the user's line of sight when the night vision device 14 is in the use position as shown in FIG. 1.

Figure 5:
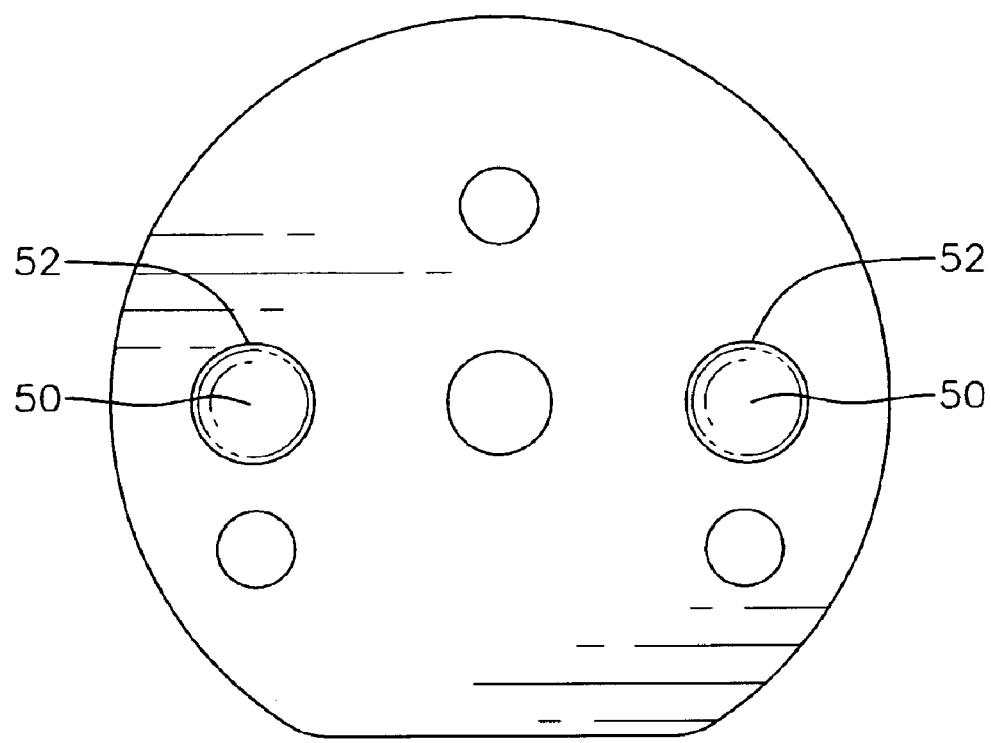
FIG. 5 is a side view of a rotary plate.

In a further exemplary embodiment of the present invention, the rotary plate 30 may rotate on at least one ball bearing. In a preferred embodiment as shown in FIG. 5, the rotary plate may rotate on two ball bearings 50. Ball bearings may reside in sockets 52 in the surface of rotary plate. As will be obvious to those skilled in the art, the present invention is not limited to two ball bearings, but may have any number of ball bearings suitable for rotation.

Figure 4:
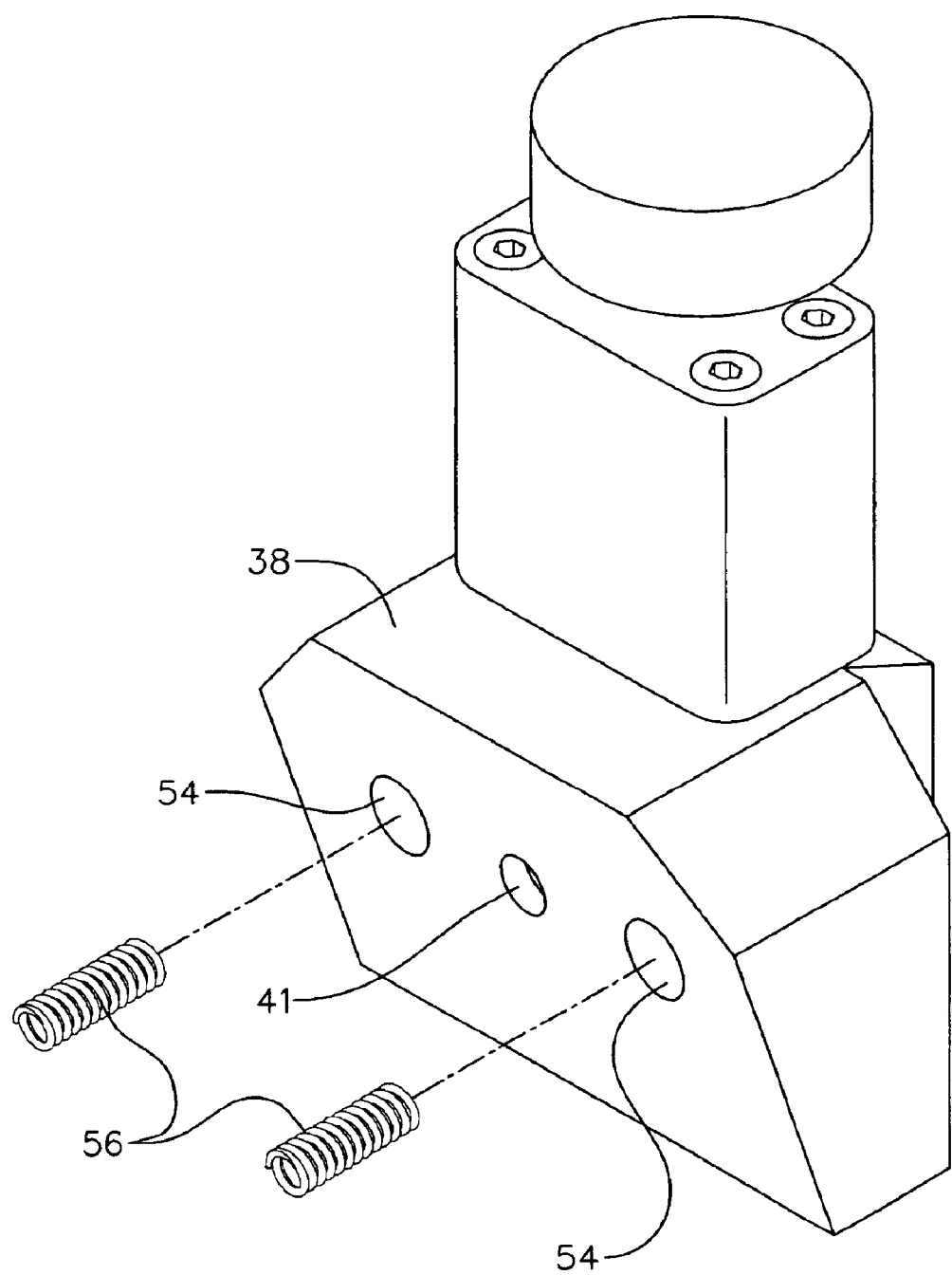
FIG. 4 is a perspective view of an exemplary embodiment of a rotatable helmet mount.

In a further preferred embodiment, a user must overcome a bias in order to rotate the helmet mount 10. In order to achieve such bias, the helmet block 38 may contain cavities 54 shaped to receive a ball bearing 50, as shown in FIG. 4. The cavities 54 may contain a spring 56 on which the ball bearing 50 may rest until enough lateral force is applied to the helmet mount 10 to displace the ball bearing 50 from the cavity 54. The depth of the cavity 54 may vary depending on the amount of resistance desired to rotate helmet mount 10.

Figure 19:
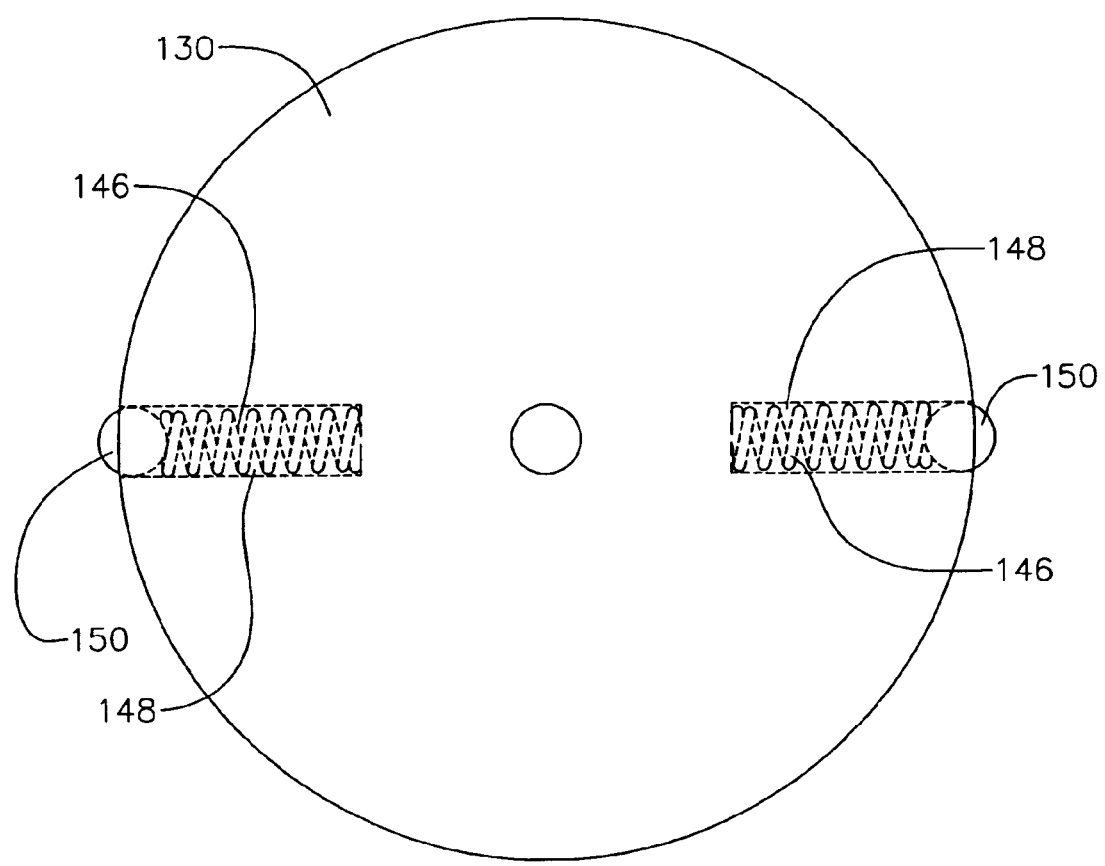
FIG. 19 is a front view of a rotary plate with an alternate configuration of a socket and a spring.

In an alternate embodiment, the helmet block 38 may be adapted to encompass a rotary plate 130. In this embodiment, the rotary plate 130 may rotate on at least one ball bearing. In a preferred embodiment, the rotary plate may rotate on two ball bearings. As shown in FIG. 19, the rotary plate may contain at least one socket on its perimeter which is oriented in the same plane at the face of the rotary plate. The socket may contain a spring on which a ball bearing may rest until enough lateral force is applied to the helmet mount to displace the ball bearing from the socket 148.

It will be obvious to one skilled in the art that the force required to adjust the night vision device from the use to the stowed position will depend on a number of factors including the number of spring-biased cavities, the size of the spring-biased cavities, the strength of the springs and the depth of the cavity, among other things.

TILT ADJUSTMENT

In addition to allowing for adjustment of the position of the night vision device 14, the rotatable helmet mount 10 also allows for adjustment of the tilt of the night vision device relative to the user's eyes. In a presently preferred embodiment shown in FIG. 9, a gear system is provided to permit tilt angle adjustment of a housing 402 of a tilt mechanism 400. In an exemplary embodiment, the tilt adjustment mechanism 400 comprises a lever 430 rotatably coupled to an upper gear 432 by any suitable means, such as a screw or rivet. The tilt adjustment mechanism 400 further comprises a lower gear 434 attached to a support column 403. The housing 402 may be rotationally coupled to the column 403 by a screw 436 or any other suitable means, such as a rivet or pin.

To adjust the tilt angle of the housing 402, a user may rotate the lever 430 causing the upper gear 432 to simultaneously rotate and allowing cogs on the upper gear 432 to interlock with cogs on the lower gear 434. Since the lower gear 434 is held in place by support column 403, the housing 402 will rotate around the screw 436 as a result of rotation of the upper gear 432. The amount of rotation of the housing 402 will be determined by the amount of rotation applied to the lever 430 by the user.

An advantage of the gear operated tilt adjustment mechanism is that it allows for one-handed tilt adjustment of the night vision device. As can be appreciated from FIG. 9, tilt adjustment can be accomplished by using only one hand to turn the lever 430. The design of the gear operated tilt adjustment mechanism allows for real-time adjustment of the tilt angle of the night vision device. Moreover, the gear operated tilt adjustment mechanism allows for substantially infinite adjustment of the tilt angle within a predetermined range, rather than limiting the tilt angle adjustment to one of a plurality of predetermined levels.

FOCAL ADJUSTMENT

Figure 9:
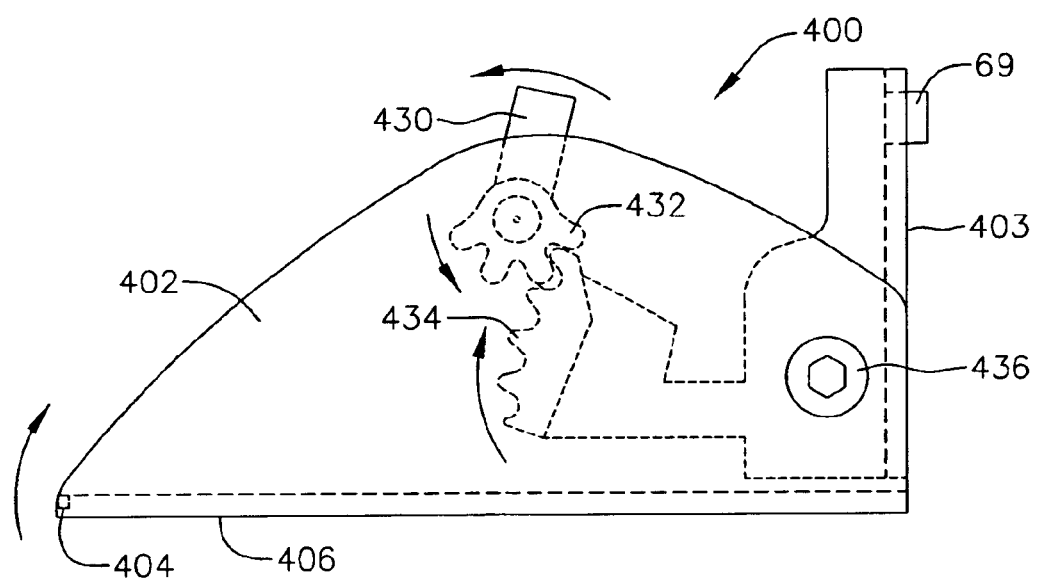
FIG. 9 is a side view of a tilt adjustment mechanism.
Figure 10A:
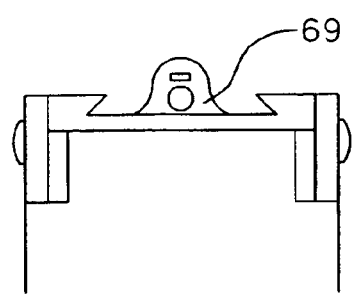
FIGS. 10a–10b are a top and rear view, respectively, of a tilt adjustment mechanism.
Figure 10B:
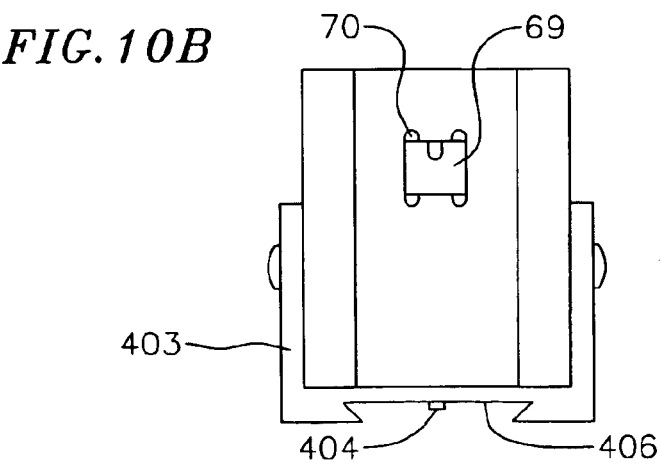

The rotatable helmet mount 10 also allows for focal adjustment of the location of the night vision device relative to the user's eyes. As described above, the night vision device is coupled with the socket assembly 152. As shown in FIG. 10b, the receiving surface 406 of the housing 402 is adapted to receive the socket assembly 152. In a preferred embodiment, the receiving surface 406 may be dovetailed to correspond to the dovetail shape of the socket assembly 152. The user may slide the socket assembly 152 along the receiving surface 406 to adjust the position of the night vision device 14 relative to the user's eyes. As shown in FIGS. 9 and 10b, the front end of the receiving surface 406 may have a protrusion 404 extending from the surface to prevent the socket assembly 152 from sliding off the housing 402.

FIGS. 11a–11c show the top half 353 of the socket assembly 352, having a top surface 409 and a bottom surface 411. As shown in FIG. 11a, in an exemplary embodiment, the top surface 409 may contain a cavity 416. The cavity 416 is adapted to receive the protrusion 404 extending from the underside of housing 402 to prevent the housing 402 from sliding off the end of the socket 353. Further, the socket 353 may comprise a focal adjustment assembly. The focal adjustment assembly may comprise a stop 414 biased by springs 410 and held in place by a rod 420 connected to a shaft 412. The stop 414 may rest so that its outer edge protrudes slightly past the edge of the top surface 409 when the housing 402 is not attached. The stop 414 may be made from a somewhat flexible material and in a preferred embodiment, may be made from nylon 6/6. The focal adjustment mechanism may further comprise a lever 422 connected to a cam (not shown) by a screw 424 or other appropriate means of connection. The lever is biased by a spring (not shown) to be in a "hold" position. In order to attach a helmet mount, the user may turn lever 422 to a "release" position. When the lever 422 is turned by a user, the cam rotates and causes the shaft 412 to move slightly toward springs 410. Movement of the shaft 412, with rod 420 attached, moves the stop 414 so that the outer edge of the stop 414 is flush with an edge of the top surface 409 and no longer protrudes. Once the stop 414 is flush with the top surface 409, the user may slide the receiving surface of the housing 402 onto the top surface 409. After the housing 402 has been attached to the socket 353, the user may release the lever 422. The spring will bias the lever 422 to return to its hold position, causing the cam to release the shaft 412 and allowing the springs 410 to exert a lateral force on the stop 414. The stop 414 will in turn exert a lateral force on receiving surface 406 holding the housing 402 in place.

In order to change the position of the housing 402 with respect to the socket 353, a user may rotate the lever 422 to the release position and slide the socket 353 to the desired position.

An advantage of the focal adjustment assembly provided is that it allows for one-handed focal adjustment of the night vision device. As can be appreciated from FIGS. 11a–11c, focal adjustment can be accomplished by using only one hand to turn the lever 422 and slide the socket 353 to the desired position.

VERTICAL ADJUSTMENT

Figure 12A:
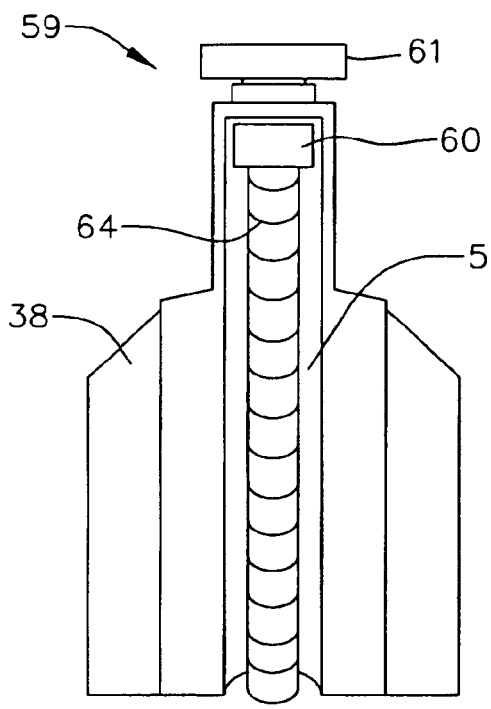
FIGS. 12a–12b are a rear and bottom view of a vertical adjustment mechanism.
Figure 12B:
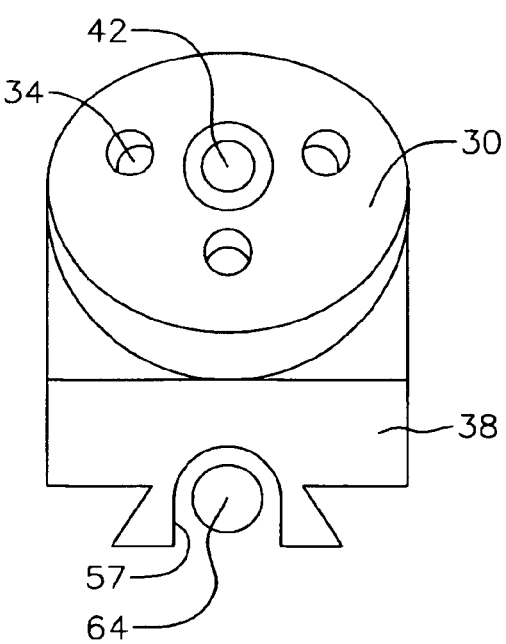

The rotatable helmet mount 10 further allows for vertical adjustment of the night vision device 14 relative to the user's eyes. In a presently preferred embodiment of the present invention as shown in FIG. 2, the vertical adjustment mechanism 59 may comprise a housing 58 attached to the helmet block 38. The housing 58 may be attached by screws, rivets, pins or by any other suitable means for attachment. Inner surfaces of the housing 58 and the helmet block 38 may be shaped to form a channel 57 as shown more clearly in FIG. 12a. A screw 64 may be used to move the mount assembly 10 vertically. The screw 64 may be inserted through a hole in the top of housing 58 and may extend through the channel 57. A flanged insert 60 with a smooth inner surface may be inserted between the screw 64 and the housing 58 and may serve to allow the screw 64 to rotate freely. The screw 64 may be attached to the support column 403 by inserting the screw 64 into a threaded member 69 (see FIG. 10a). The threaded member 69 may be attached to the support column 403 by placing the member into a cavity 70 that may be centrally located on the surface of column 403. The threaded member 69 may be machined to have a generally rounded body and a generally square base. Through the center of the member 69 may be a threaded hole adapted to receive the screw 64. The cavity 70 may be sized to receive and hold the member 69 as shown in FIG. 10b.

In order to adjust the vertical position of the night vision device, a user may turn a knob 61 which will turn threads of the screw 64. This will result in the helmet mount moving either up or down, depending on the direction of rotation of the screw 64. In a preferred embodiment, so as not to allow the user to completely detach the support column 403 from the screw 64, there may be a protrusion on the screw which prevents the screw from further rotation once it has reached a predetermined location.

While various embodiments of this invention have been shown and described, it would be apparent to those skilled in the art that many more modifications are possible without departing from the inventive concept herein. For example, although the tilt and focal adjustment assemblies have been illustrated on one side of the rotatable helmet mount, is should be realized that the assemblies could easily be located on either side of the rotatable helmet mount. In other words, the rotatable helmet mount could be designed for one-handed operation by either the right or left hand of the user. It is, therefore, understood that within the scope of the appended claims, this invention may be practiced otherwise than as specifically described.

What is claimed is:

1. A rotatable mount for a night vision device having means to attach to headgear wherein the mount is rotatable about a point in front of the headgear and above the line of sight of the user between a use position and a stowed position in a circular motion within a plane which is generally tangential to a point of attachment of the night vision device and the headgear.

2. A rotatable mount according to claim 1 wherein the attachment means is a lock plate.

3. A rotatable mount according to claim 1 wherein the headgear is a helmet.

4. A rotatable mount according to claim 1 wherein, in a stowed position, the center of gravity of the night vision device is substantially over the user's head.

5. A rotatable mount according to claim 1, further comprising a vertical adjustment assembly comprising:
- a screw having a rotation knob, a smooth top portion and a threaded lower portion; and
- a threaded member adapted to receive the screw;
- wherein when the rotatable mount is secured to the headgear and the night vision device is secured to the rotatable mount, rotation of the knob moves the night vision device vertically relative to a user's eyes.

6. A rotatable mount according to claim 1, wherein the mount is rotatable in both a clockwise and a counter-clockwise direction.

7. A rotatable mount for a night vision device having means to attach to headgear wherein, in a stowed position, an eyepiece of the night vision device is substantially flush with the headgear.

8. A rotatable mount according to claim 7 wherein the attachment means is a lock plate.

9. A rotatable mount according to claim 7 wherein the headgear is a helmet.

10. A rotatable mount for a night vision device having means to attach to headgear wherein, in a stowed position, the center of gravity of the night vision device is substantially directly above the attachment means and an eyepiece of the night vision device is directed toward the headgear.

11. A position adjustment assembly adapted for rotatably attaching a night vision device to a helmet, the position adjustment assembly comprising:
- a rotary plate;
- a helmet block rotationally coupled to the rotary plate in a circular motion within a plane which is generally tangential to a point of attachment of the night vision device and the headgear; and
- a spring-biased ball and socket system located between the helmet block and rotary plate including at least one socket, at least one spring and at least one ball biased against the rotary plate by the corresponding spring.

12. The position adjustment assembly according to claim 11 further comprising a lockplate attached to the rotary plate, which allows the helmet block to be attached to the helmet.

13. The position adjustment assembly according to claim 11 wherein there are two sockets, two springs and two balls and each ball is biased against the rotary plate by the corresponding spring.

14. The position adjustment assembly according to claim 11, wherein the helmet block is rotatable in both a clockwise and a counter-clockwise direction.

15. A tilt angle adjustment assembly adapted for use in a rotatable helmet mount for a night vision device, the tilt angle adjustment assembly comprising:
- a lever having a gear head attached thereto;
- and a receiving gear wherein rotation of the lever causes the gear head to rotate with respect to the receiving gear to produce a rotation of the night vision device relative to a user's eyes.

* * * * *